United States Patent [19]

Engelmann et al.

[11] 4,136,809
[45] Jan. 30, 1979

[54] PAPER TRANSPORT DEVICE

[75] Inventors: Gottfried Engelmann, Irschenhausen; Guenter Christoph, Munich, both of Germany

[73] Assignee: Siemens Aktiengesellschaft, Berlin & Munich, Germany

[21] Appl. No.: 820,215

[22] Filed: Jul. 29, 1977

[30] Foreign Application Priority Data

Aug. 12, 1976 [DE] Fed. Rep. of Germany ....... 2636387

[51] Int. Cl.² .......................................... B65H 17/38
[52] U.S. Cl. ........................................ 226/79; 226/81; 226/87
[58] Field of Search ............... 226/76, 79, 80, 81, 226/86, 87; 346/136

[56] References Cited

U.S. PATENT DOCUMENTS

| 2,113,579 | 4/1938 | Dybvig | 226/81 X |
| 2,120,735 | 6/1938 | Debrie | 226/191 |
| 2,599,648 | 6/1952 | Lanegan | 226/81 X |
| 3,380,678 | 4/1968 | Feasey | 226/191 UX |
| 3,410,469 | 11/1968 | Deeg | 226/81 |
| 3,512,693 | 5/1970 | Utsumi | 226/87 X |
| 4,022,365 | 5/1977 | Weller | 226/81 |

FOREIGN PATENT DOCUMENTS 152658  2/1952  Australia .................................. 226/191

Primary Examiner—Richard A. Schacher
Attorney, Agent, or Firm—Hill, Gross, Simpson, Van Santen, Steadman, Chiara & Simpson

[57] ABSTRACT

A paper transport device utilizing pins for indexing with paper having perforated margins. Pin carrying rings are eccentrically mounted at the ends of a platen and project radially through circumferentially spaced slots in platen end portions with the pins projecting beyond the platen surface for only a portion of the platen's circumference.

9 Claims, 3 Drawing Figures

PAPER TRANSPORT DEVICE

BACKGROUND OF THE INVENTION

1. Field of the Invention

This invention relates to paper transport devices and more particularly to paper transport rollers of the type having paper perforation engaging pins.

2. Prior Art

This invention is directed to that class of devices which are used for the transportation of paper having perforations along both sides. Such devices are normally used in printing devices, and in particular teleprinters, to draw the paper around a platen in a controlled paper movement manner. The platen is usually equipped with pin wheel rims at both ends thereof.

In this connection, it is known in teleprinters and other printing devices which employ perforated paper, to provide the platen with pin wheel rims which are firmly connected adjacent the ends of the platen. For various constructional reasons, the provision of pin wheel rims having fixed pins positioned over the entire circumference of the platen frequently presents difficulties. It has therefore been proposed to provide a radial movement to the pins by means of a cam control mechanism. In this type of construction those areas of the mechanism in which fixed pins would constitute an obstruction may be freed for structural members.

Because of the complexity of pin movement devices, such as the above mentioned cam control constructions, it is a desire of this invention to provide a paper transport device which facilitates movement of the paper in a controlled manner by means of pins which project, or which operatively project, only over a portion of the circumference of the platen. However, it is desired to construct the device in such a manner as to avoid the heretofore used cam controlled radial movement guided pins and to thereby achieve a technologically simpler device.

SUMMARY OF THE INVENTION

The above-described objective is realized according to this invention by providing axial end portions of the platen with axial slots which are distributed uniformly around the circumference of the platen. The slots have a circumferential spacing corresponding to the spacing between the paper perforations. In the cross section areas of the platen defined by the slot areas, pin wheels are mounted in juxtaposition to the platen. The pin wheels are rotatable and eccentric in relation to the platen axis. In this manner only a portion of the pin wheel pin outer periphery will project through the slots and into engagement with the perforations in the paper received around the platen.

Thus the pin wheel pins will project through the slots of the platen for only a portion of the platen circumference. The driven platen drives the pin wheels which in turn drive the paper by means of engagement between the pins and the walls of the paper perforation.

In one advantageous embodiment of the invention, the pin wheels are mounted in a manner so as to be axially displaceable on their eccentric bearings. This insures that the spacing between the two pin wheels can be axially repositioned to correspond to the transverse spacing of the paper perforation.

In a further advantageous embodiment, the slots in the platen are constructed having a rectangular shape having a longitudinal axis parallel to the platen axis. The pin wheel is likewise provided with rectangular shaped teeth positioned around the circumference of the pin wheel. The pins project radially out from the teeth and the teeth are designed to index with the platen slot walls. This design of the slots and teeth provides a drive connection of the pin wheel to the platen while at the same time allowing mobility of the pin wheels on their eccentric bearing. Furthermore construction of the teeth and slots as rectangular members provides a particularly large contact surface between the teeth and the platen slots resulting in a relatively low wear power transmission interface.

In a further development of the invention, the platen is constructed as a tubular member having end cap components firmly connected at both ends and rotatably mounted on the platen axis. The end components contain the pin projecting slots. This provides an inexpensive and uncomplicated construction for the platen.

In another embodiment of the invention, the eccentric bearing of the pin wheel is designed to be pivotable. By allowing pivotability of the pin wheel, the area of contact between the pin wheel and the platen or the platen end cap is displaceable. This provides for adaptation to differing structural conditions while at the same time serving as a means to simplify paper insertion. When the paper is inserted it is possible to adjust the eccentric bearing of the pin wheel in such a way that the pins are not projecting in the region of the paper thereby allowing ease of paper movement with respect to the platen. In such a condition, the pin wheels are not pivoted into their operative position until after the paper has been inserted and aligned.

It is therefore an object of this invention to provide an improved paper transport device of the type utilizing projecting pins indexing with paper perforations.

It is a more particular object of this invention to provide a paper transport platen having radially extending pins for engagement with paper side margin perforations wherein the pins are eccentric to the platen axis such that the pins project beyond the platen surface for only a portion of the circumference of the platen.

It is another, more particular, object of this invention to provide a platen paper transport mechanism having radially projecting pins for indexing with paper marginal perforations wherein the pins are formed on a pin wheel eccentrically mounted with respect to the platen, the pins projecting through axial slots adjacent axial ends of the platen, the slots serving to drive the pin wheels, and the eccentric mounting of the pin wheels providing for projection of the pins beyond the platen surface for only a portion of the platen circumference.

It is yet another object of this invention to provide a pin wheel construction for a platen wherein the pin wheel is eccentrically mounted with respect to the platen such that the pins project beyond the platen surface for only a portion of the circumference of the platen, the pins being mounted on a pin wheel and the pin wheel being displaceable radially to allow withdrawal of the projecting pins below the platen surface to facilitate paper insertion and alignment.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

DESCRIPTION OF THE PREFERRED EMBODIMENT

Figure 1:
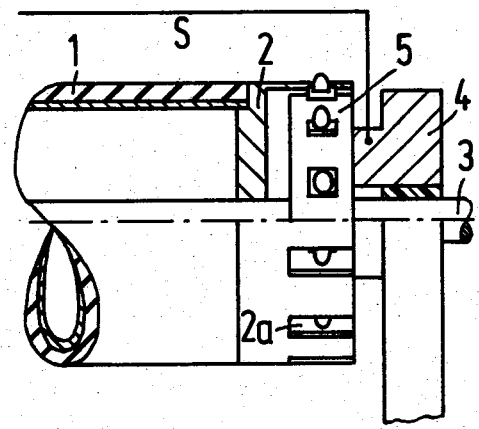
FIG. 1 is a fragmentary view, partially in section, of an axial end of a platen equipped with the construction.

FIG. 1 illustrates an axial end of a platen assembly according to this invention. The figure is a sectional view above the center line and a plan view below the center line. Although FIG. 1 illustrates only one axial end of the platen assembly, it is to be understood that an equivalent structure is provided at the other axial end. Thus both ends of the platen 1 are sealed by end cap members 2. The end members 2 are provided with rectangular slots 2a which may be open at the axial ends as illustrated. The end members are similarly sized and constructed with relation to the platen having the same exterior diameter and a hollow tubular section. The end members are closed at their axial insides and are firmly connected to the platen. The end members 2 are rotatably mounted on the axis 3.

Pin wheels 5 are mounted on cams 4 within the end members 2. The pin wheels 5 are equipped with radial pins 5a. Cams 4 are stationary relative to the rotation of the platen.

Figure 2:
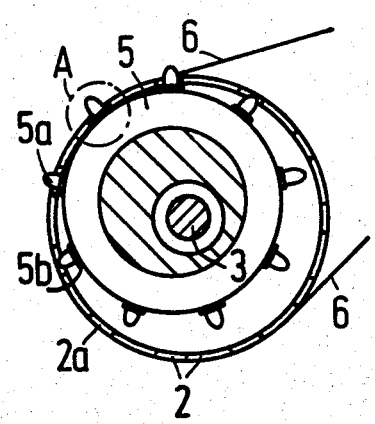
FIG. 2 is a perspective cross section view taken generally along the line S of FIG. 1

FIG. 2 is a cross section taken generally along the vertical portion of the line S and extending through the cam 4. As will be apparent from FIG. 2 only a few of the pins 5a extend through the slots 2a in the end members 2 and project beyond the platen surface. Only the projecting pins contact the paper 6 and engage in paper margin perforations. The pins 5a maintain the paper in the desired alignment around platen 1.

Figure 3:
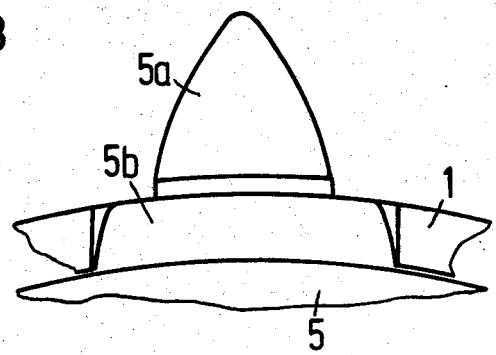
FIG. 3 is an enlarged fragmentary view of the area A of FIG. 2.

As illustrated in FIG. 3, which is an enlarged view of the area A of FIG. 2, the pin 5a is formed atop a base tooth 5b attached to the pin wheel 5. Except for a slight size tolerance, the tooth 5b is sized to be circumferentially received within the circumferential extent of the slots 2a and has flat sides at the circumferentially leading and trailing edges of the tooth for engagement with the walls of the slots 2a. The height of the tooth 5b is dimensioned with respect to the wall thickness of the end member 2 such that the tooth does not project beyond the outer periphery thereof. The pin 5a, which is of conventional design, extends upwards, in substantially a conical form, from the top of the tooth 5b.

The slots 2a in the end components 2 are uniformly distributed around the circumference thereof and have a spacing which corresponds to spacing between the perforations and the paper. The longitudinal axis of the slots 2a is parallel to the platen axis 3. As the longitudinal dimension of the slot is greater than the dimension of the tooth 5b received therein, axial displacement of the pin wheel on the eccentric bushing 4 is permitted thereby allowing the spacing between the pin wheels and opposite ends of the platen to be adjusted.

During operation the platen 1 is driven by normal means. Due to the engagement between the slots 2a and the teeth 5b, the end components will drive the pin wheels 5. The pins 5a of the wheels 5, which project beyond the platen surface will engage the paper perforations to draw the paper around the platen and maintain it in proper alignment.

As a further improvement, it is possible to design the cam 4 such that it is pivotable. As illustrated in FIG. 1, this can easily be accomplished by mounting the cam 4 on an elastomeric pad at one axial end of the cam thereby allowing axial tilting of the cam. This pivotability allows the cam to radially move during insertion of the paper in such a manner that the pins will be withdrawn below the platen surface in the area of paper contact with the platen. This pivotability of the cam 4 also allows the pin which is marked by the letter A in FIG. 2 which is the location of contact between the platen end component inner diameter and the pin wheel, to be moved to another circumferential position on the platen should the paper contact area of the platen be changed.

It can therefore be seen from the above that this invention provides a paper transport system utilizing a platen having axially extending circumferentially spaced apart slots at opposite axial ends thereof. An eccentrically mounted cam wheel is positioned interior of the platen ends in the area of the slots and has tooth members projecting into some of the slots around the periphery of the platen in an area where paper received around the platen will be engaging the platen. The teeth engage side walls of the slots. The teeth are capped with projecting pins which extend through the slots and can engage paper perforations. The pin wheel is rotatably mounted on an eccentric cam which is rotationally stationary. In a modification of the invention, a pivotable cam has been shown allowing the pin wheel to be depressed to withdraw the pins from a projecting state to allow paper insertion and adjustment without interference by a projecting pins and to further allow the area of projection of the pins to be changed with respect to the platen circumference. Further this invention has illustrated an axially displaceable pin wheel allowing the distance between the two pin wheels to be modified.

Although the teachings of our invention have herein been discussed with reference to specific theories and embodiments, it is to be understood that these are by way of illustration only and that others may wish to utilize our invention in different designs or applications.

We claim as our invention:

1. A paper transporting device comprising a platen having tubular end portions with circumferentially spaced apart slots therethrough, pin wheels received within said tubular end portions having radially extending circumferentially spaced pins, and eccentric mounts for said pin wheels, said eccentric mounts effective to position the pin wheels with respect to the platen such that pins project through said slots for only a portion of the circumference of the platen, said pins having a radial dimension sufficient to engage side margin perforations in a paper received around said platen, the slots have circumferentially spaced apart axially extending walls parallel to the platen axis, the pin wheel having projecting teeth portions having circumferentially spaced axially projecting walls dimensioned to be received in said slots, at least some of said teeth portions projecting into at least some of said slots, pins formed on radial end portions of the teeth and projecting radially therebeyond, the teeth having a radial dimension sufficient to project into the slots but insufficient to project beyond the platen surface.

2. A device according to claim 1 wherein the pin wheels are axially movable.

3. A device according to claim 1 wherein the platen is provided with axial end components, said slots being formed in said axial end components and said eccentrically mounted pin wheels being received within said end components, said end components being non-relatively rotatably affixed to said platen.

4. A device according to claim 1 wherein the pin wheel is radially movable.

5. The device according to claim 4 wherein the radial movability is provided by a pivotable mounting of the eccentric mounting.

6. A device according to claim 2 wherein the pin wheel is radially movable to radially inwardly withdraw the pins from projections through the slots whereby circumferential alignment of the pin wheel and platen can be adjusted.

7. A paper transport device comprising: a platen having an outer diameter and axial ends, at least on axial end of said platen having a plurality of circumferentially spaced apart slots entending therethrough, said one axial end having a hollow interior portion, a radially projecting pin carrying member received in said hollow portion, said pin carrying member supported on a mounting, said mounting being eccentric to an axis of the platen, at least some of said pins projecting through said slots beyond the outer diameter of the platen, and said pins projecting beyond said outer diameter for only a portion of the circumference of the platen, the pin carrying member comprises a ring having pins projecting from an outer circumference thereof, said pins circumferentially spaced from one another by a distance equivalent to the distance of circumferential spacing of the slots, said ring relatively rotatably mounted on an eccentric bushing, means restraining said eccentric bushing from rotation, and drive means between the platen and the pin carrying ring, said ring is radially movable by a distance at least as great as the radial projecting of said pins whereby the pins can be withdrawn from projection through said slots.

8. The device according to claim 7 wherein the drive means comprise a drive engagement between circumferentially opposed axially extending walls of said slots and circumferentially opposed axially extending raised walls of said ring.

9. The device of claim 7 wherein the ring is axially movable with respect to the platen.

* * * * *